United States Patent [19]
Nakamura et al.

[11] Patent Number: 5,457,488
[45] Date of Patent: Oct. 10, 1995

[54] METHOD AND APPARATUS FOR CONTROLLING ARRAY OF LIGHT-EMITTING ELEMENTS

[75] Inventors: Yukio Nakamura; Hiroshi Furuya; Takatoku Shimizu; Kazuo Tokura; Mio Chiba; Kengo Ohtaka; Takeyuki Yanagibashi; Takashi Ishizaki, all of Tokyo, Japan

[73] Assignee: Oki Electric Industry Co., Ltd., Tokyo, Japan

[21] Appl. No.: 225,724

[22] Filed: Apr. 11, 1994

[30] Foreign Application Priority Data

Apr. 12, 1993 [JP] Japan .................................. 5-084914
Aug. 24, 1993 [JP] Japan .................................. 5-209406

[51] Int. Cl.⁶ ................................................ G01D 15/10
[52] U.S. Cl. ...................................... 347/237; 347/240
[58] Field of Search ....................... 358/298; 346/76 PH; 400/120, 120.01, 120.05; 347/131, 144, 237, 238, 240

[56] References Cited

U.S. PATENT DOCUMENTS

| | | | |
|---|---|---|---|
| 4,455,562 | 6/1984 | Dolan | 346/154 |
| 4,455,578 | 6/1984 | Fearnside | 347/237 |
| 4,525,729 | 6/1985 | Agulrek | 347/238 |
| 5,126,758 | 6/1992 | Kikuno | 347/240 |
| 5,142,301 | 8/1992 | Matsumoto | 346/76 PH |

FOREIGN PATENT DOCUMENTS 161748  12/1981  Japan ..................................... 400/719

Primary Examiner—Ren Yan
Assistant Examiner—Steven S. Kelley
Attorney, Agent, or Firm—Spencer, Frank & Schneider

[57] ABSTRACT

An array of light-emitting elements is switched on and off to produce a graded-intensity image on a photosensitive medium. Each light-emitting element is controlled by M-bit data representing the intensity of one image pixel, where M is a fixed integer greater than one. M strobe signals are generated for non-overlapping time intervals of different lengths, to strobe the M data bits for each light-emitting element. When strobed, each data bit switches its corresponding light-emitting element on or off. Image intensity depends on the total amount of time for which each light-emitting element is switched on.

22 Claims, 14 Drawing Sheets

METHOD AND APPARATUS FOR CONTROLLING ARRAY OF LIGHT-EMITTING ELEMENTS

BACKGROUND OF THE INVENTION

The present invention relates to a method and apparatus for controlling an array of light-emitting elements to create an intensity-graded image on a photosensitive medium.

Such arrays are employed, for example, in printers, copiers, and similar devices in which the photosensitive medium is a revolving photosensitive drum and the array is a linear array of light-emitting diodes (hereinafter, LEDs). The image formed on the drum is an invisible image consisting of electrical charges, which is typically developed by applying toner particles, then transferred to paper.

To print color images or halftone monochrome images, the light-emitting elements must produce an intensity-graded image. This is conventionally done by controlling the voltage at which the light-emitting elements are driven, thereby controlling the intensity with which they illuminate the photosensitive medium. A drawback of this method is that the intensity data are normally provided in digital form, from a computer, for example, so it is necessary to convert the digital data to a graded range of analog voltages. A separate digital-to-analog converter for this purpose must be provided for each light-emitting element. These digital-to-analog converters require complex circuitry, typically employing a precision resistor ladder that is difficult and hence costly to fabricate. Further, the digital-to-analog converters take up considerable space in an integrated circuit.

SUMMARY OF THE INVENTION

It is accordingly an object of the present invention to create an intensity-graded image without having to generate a graded range of analog voltages.

Another object of the invention is to create an intensity-graded image with simple circuitry.

Yet another object of the invention is to avoid electromagnetic interference.

The invented method and apparatus controls an array of light-emitting elements by storing, for each light-emitting element, M-bit data representing the intensity of one image pixel. (M is a fixed integer greater than one). M strobe signals are generated for non-overlapping time intervals of different lengths. The M strobe signals strobe the M data bits for each light-emitting element. When strobed, each data bit switches its corresponding light-emitting element on or off, depending on whether the bit value is one or zero. Image intensity depends on the total amount of time for which the light-emitting element is switched on.

DETAILED DESCRIPTION OF THE INVENTION

Embodiments of the invention will be described below with reference to the attached drawings. The drawings are illustrative and do not limit the scope of the invention, which should be determined solely from the appended claims.

Figure 1:
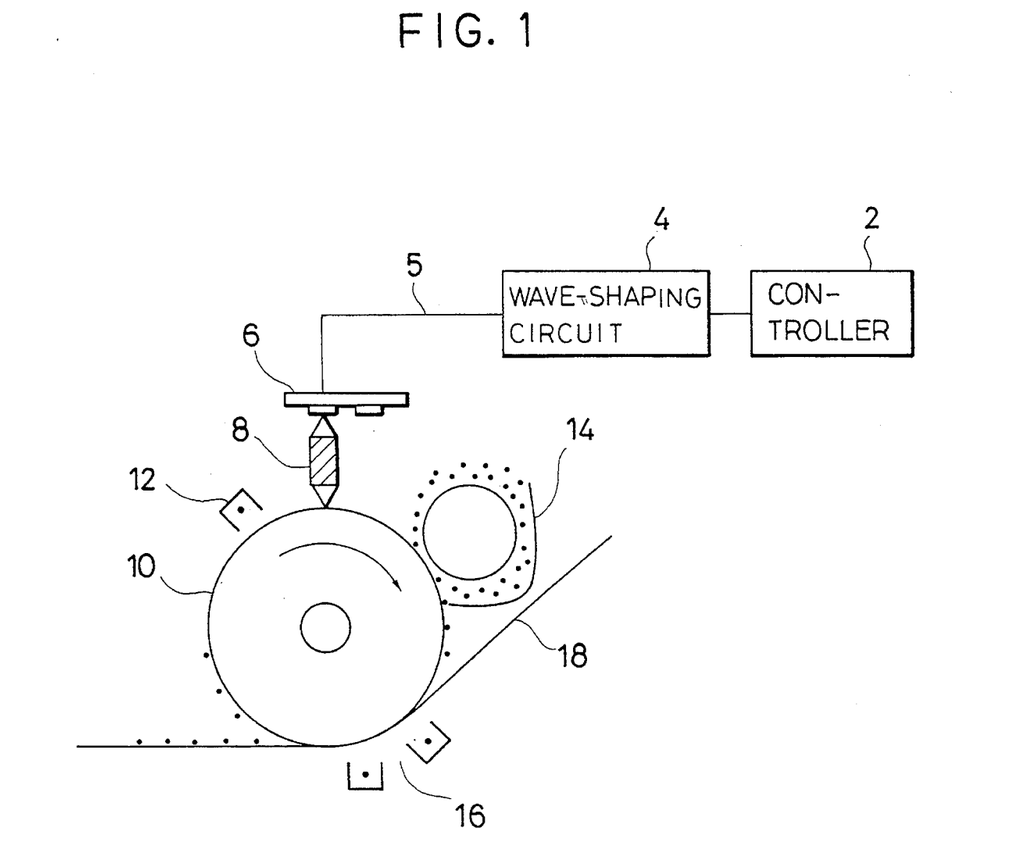
FIG. 1 illustrates a LED printer employing the present invention.

As an example of a product in which the invention can be employed, FIG. 1 illustrates the main parts of a LED printer. A controller 2 receives image information from an external device such as a computer or scanner and converts the image information to intensity data, which it stores in a memory not shown in the drawing. The original image information may be either digital or analog; if analog, the controller 2 converts it to digital data. The intensity data generated by the controller 2 comprise M bits per image pixel, where M is an integer greater than one.

The controller 2 reads the intensity data from the memory and sends it via a wave-shaping circuit 4 and cable 5 to a LED print head 6 comprising a certain number N of LEDs and their associated electronics. The LEDs are aligned with a converging rod lens array 8, which focuses light emitted by the LEDs onto a rotating photosensitive drum 10. As the photosensitive drum 10 rotates, a corona charger 12 imparts an electrical charge to its surface. Illumination of the surface of the photosensitive drum 10 by the LEDs enables charge to escape into the interior of the drum. In this way an invisible electrostatic image is formed on the surface of the drum 10. A developer unit 14 develops the image by applying toner particles, which adhere to the drum surface in greater or lesser quantities depending on the surface charge. A transfer unit 16 then transfers the toner to a sheet of paper 18.

If the printer is designed to print at three hundred dots per inch on A4-size paper, then the number N of LEDs is, for example, two thousand five hundred sixty. If the intensity scale has, for example, one hundred twenty-eight intensity levels, then M is seven. These numbers will be assumed for illustrative purposes in the following description, although of course the invention is not limited to any particular values of M and N.

The invention is also not limited to the use of LEDs. It can obviously be practiced for control of other types of light-emitting elements.

Figure 2:
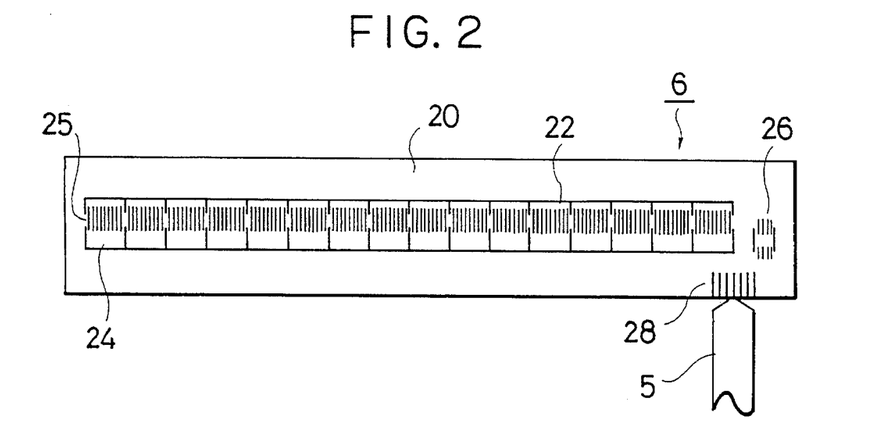
FIG. 2 is a plan view of the LED print head in FIG. 1.

Referring to FIG. 2, the LED print head 6 comprises a printed circuit board 20 on which are mounted a plurality of integrated LED arrays 22 and a like plurality of integrated driver circuits 24. The integrated LED arrays 22 and integrated driver circuits 24 are interconnected by, for example, gold wires 25. A wave-shaping circuit 26 is also mounted on the printed circuit board 20. The printed circuit board 20 has a plurality of input terminals 28 to which the cable 5 is attached, and printed wiring traces (not explicitly shown) which couple the input terminals 28 to the wave-shaping circuit 26 and integrated driver circuits 24.

Figure 3:
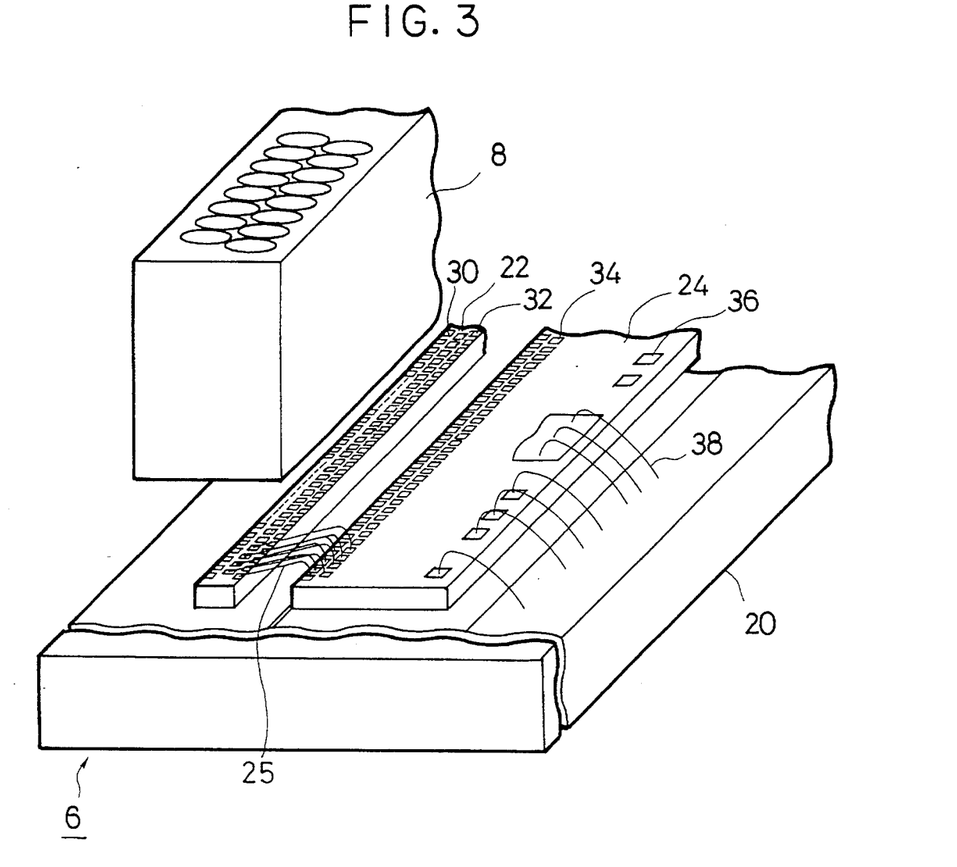
FIG. 3 is an oblique view of the LED print head.

FIG. 3 is a partial oblique view of the LED print head 6 and rod lens array 8, showing one integrated LED array 22 and one integrated driver circuit 24. The integrated LED array 22 comprises a plurality of LEDs 30 disposed in a linear row, aligned with the rod lens array 8, and a matching plurality of input electrodes 32 disposed in a staggered arrangement made necessary by the close spacing of the LEDs. The integrated driver circuit 24 has a matching arrangement of output electrodes 34, to which the input electrodes 32 are bonded by the gold wires 25, and further input terminals 36, which are coupled by wires 38 to terminals (not shown) on the printed circuit board 20. For clarity, the drawing shows only the first few gold wires 25.

The number of LEDs 30 per integrated LED array 22 is at present typically sixty-four to one hundred twenty-eight. In the following description it will be assumed that each integrated LED array 22 contains sixty-four LEDs 30, so to provide two thousand five hundred sixty LEDs in all, there are forty integrated LED arrays 22 (64×40=2560). Likewise, there are forty integrated driver circuits 24.

Figure 4:
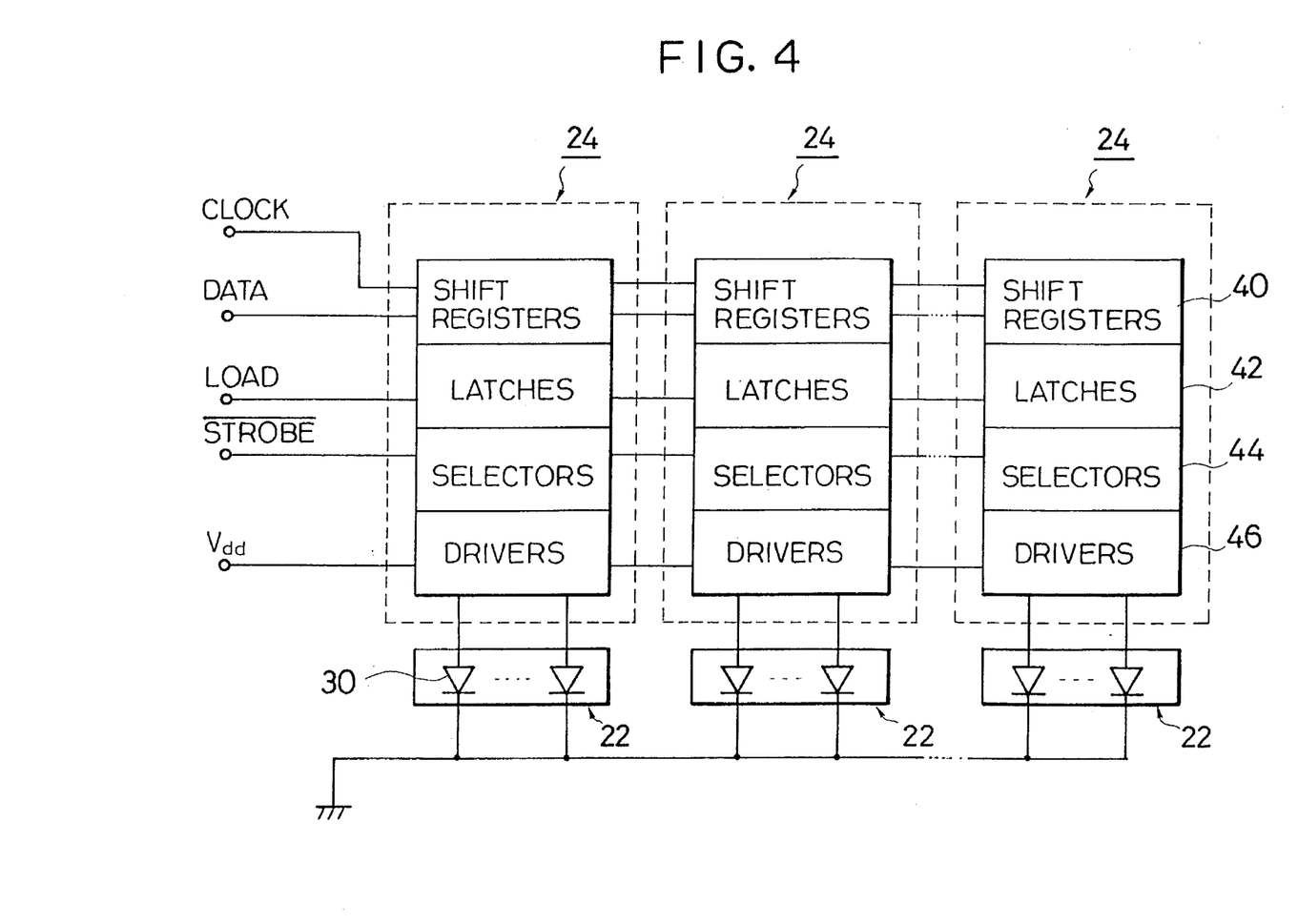
FIG. 4 is a block diagram of the LED print head.

FIG. 4 illustrates the main blocks of the integrated driver circuits 24 and their input signals. Each integrated driver circuit 24 has a shift-register section 40 comprising a set of seven sixty-four-bit shift registers. These shift registers are coupled in series from one integrated driver circuit 24 to the next, so that if there are forty integrated driver circuits 24, the interconnected shift registers function as seven 2560-bit shift registers. Intensity data from the controller 2 are fed into the first integrated driver circuit 24 and shifted through its shift registers, then through the shift registers in the next integrated driver circuits 24, and so on. The shift registers are driven by a clock signal, which is also supplied from the controller 2.

Each integrated driver circuit 24 also has a latch section 42 comprising a set of latches controlled by a load signal, a selector section 44 comprising a set of selectors controlled by a set of strobe signals, and a driver section 46 comprising a set of drivers that supply drive current to the LEDs 30. The driver, selector, and latch sections 46, 44, and 42 comprise one driver and one selector for each driven LED, and enough latches (64×7=448) to separately latch and store all bits stored in the shift register section 40.

Figure 5:
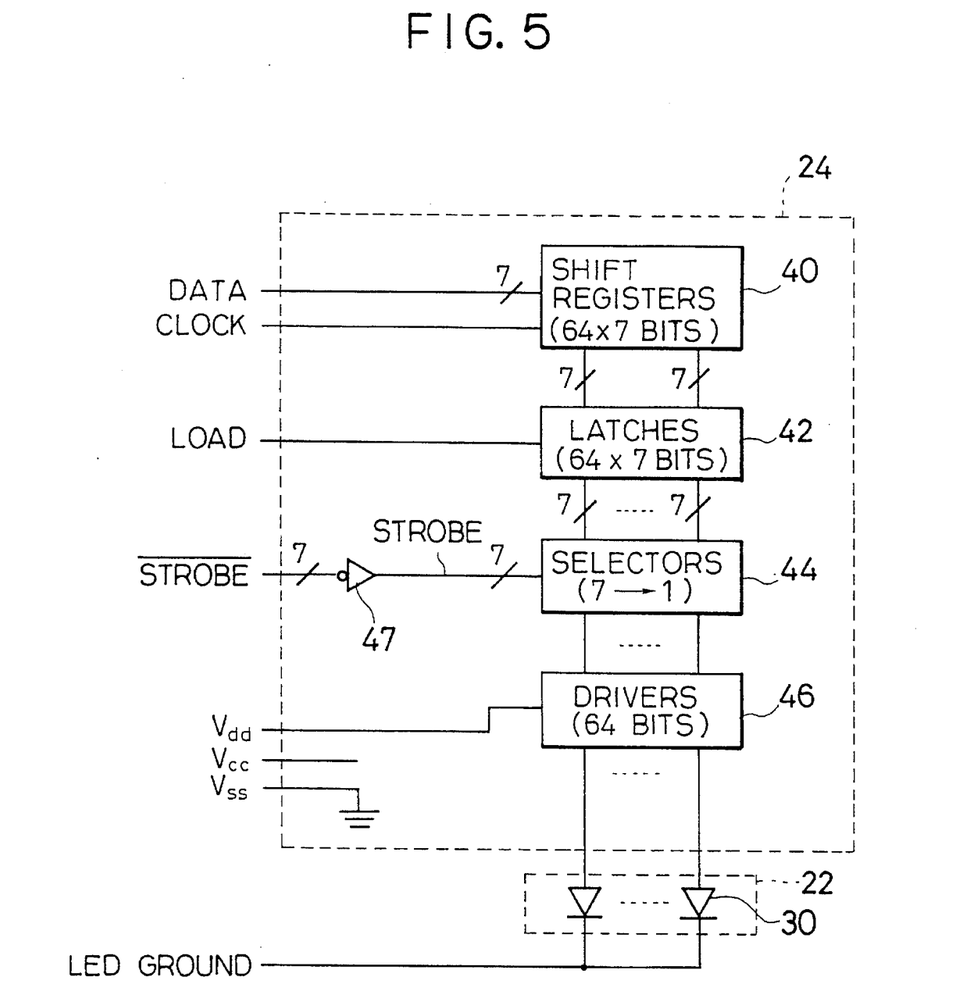
FIG. 5 is a block diagram of one integrated circuit in the LED print head.

FIG. 5 is a block diagram of one integrated driver circuit 24, showing the interconnections between blocks. The input data are supplied as seven-bit parallel data to the shift-register section 40, one bit of the seven bits being fed into each shift register. The shift register contents are supplied in parallel to the latch section 42. When a load pulse is received, all bits stored in the shift-register section 40 are latched simultaneously by the latches in the latch section 42. The latched data are supplied to the selector section 44, each selector receiving seven bits representing the intensity of one pixel. The selector converts these seven bits to a one-bit signal that turns one driver on or off.

The number of strobe signals that control the selector section 44 is equal to M, the number of intensity data bits per pixel (seven in the present description). In FIG. 5 these seven strobe signals are supplied from the controller 2 through an inverter circuit 47 comprising seven parallel one-bit inverters.

The entire integrated driver circuit 24 is supplied with power at two voltages labeled Vcc and Vss in FIG. 5. The cathodes of the LEDs 30 are coupled to a common ground.

Figure 6:
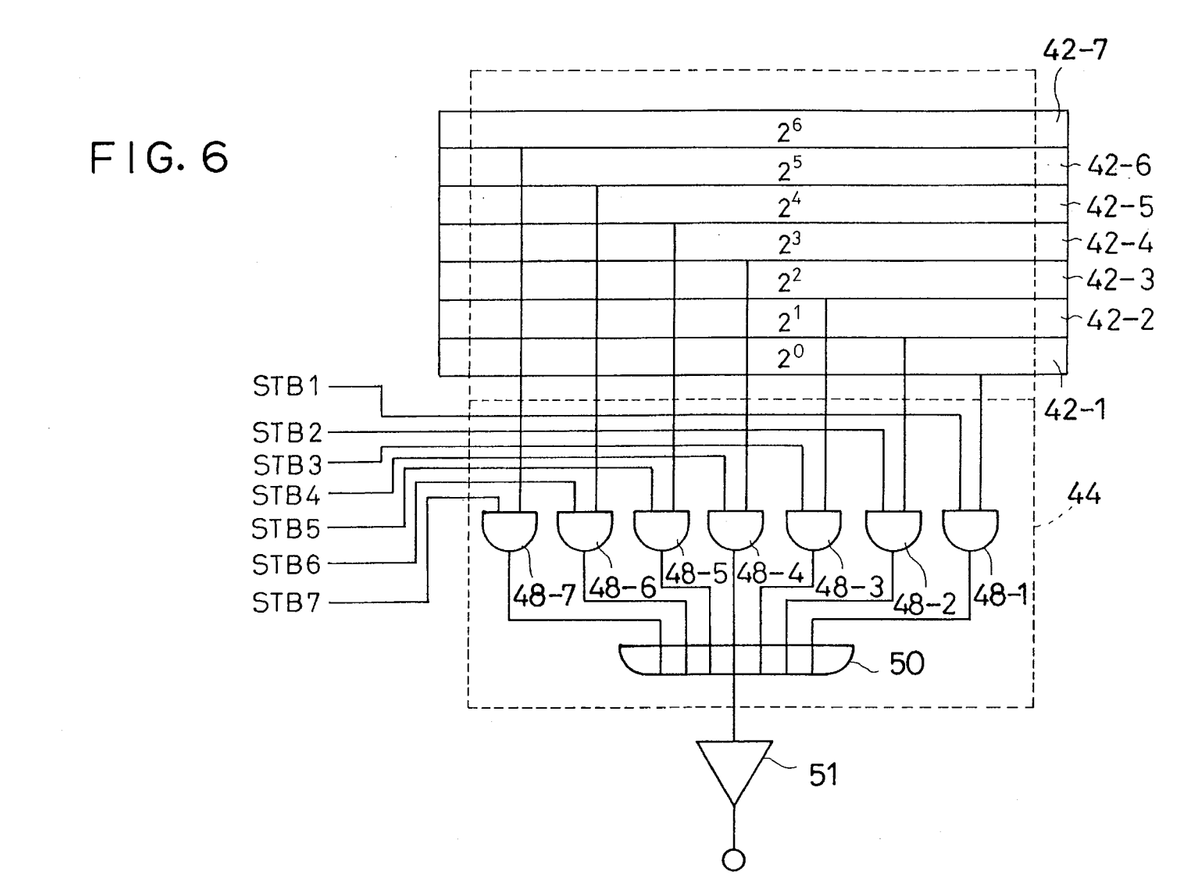
FIG. 6 is a circuit diagram of one selector in the integrated circuit of FIG. 5.

FIG. 6 shows the circuit structure of one of the selectors in the selector section 44 in FIG. 5, also showing its seven associated latches 42-1 to 42-7 and single associated driver 51. The powers of two shown in the latches indicate the weights of the data held therein, $2^0$ indicating the least significant bit and $2^6$ the most significant bit. The seven strobe signals are labeled STB1 to STB7. These are input, respectively, to seven AND gates 48-1 to 48-7. Each AND gate 48-m also receives the output of a corresponding latch 42-m (where m is an integer from one to seven). The outputs of the AND gates 48-1 to 48-7 are fed to a seven-input OR gate 50. The output of the OR gate 50 is amplified by the driver 51 in the driver section 46, which supplies a connected LED (not shown) with zero current when the output of the OR gate 50 is low, and a constant positive current when the output of the OR gate 50 is high.

The selectors in the selector section 44 are not limited to the circuit structure shown in FIG. 6. Various other configurations of logic gates, transmission gates, or other circuits can be used to provide the same function of selecting one out of M intensity data bits in accordance with M strobe signals.

Next the operation of the integrated driver circuits 24 will be described, referring to FIGS. 1, 4, 7, and 8.

Referring to FIGS. 1 and 4, to print one line of pixels, the controller 2 sends their intensity data one pixel (seven bits) at a time to the shift-register sections 40 in the integrated driver circuits 24, in synchronization with clock pulses. During this time the load signal remains low, so the data held in the latch section 42 do not change. After two thousand five hundred sixty clock pulses, intensity data for the entire pixel line have been transferred into the shift-register sections 40, data for sixty-four pixels being held in each individual shift register section 40. At this point the controller 2 outputs a high load pulse, causing all the transferred data in the shift-register sections 40 to be latched in the latch sections 42. Then the controller 2 begins transferring the next line of pixel intensity data.

Figure 7:
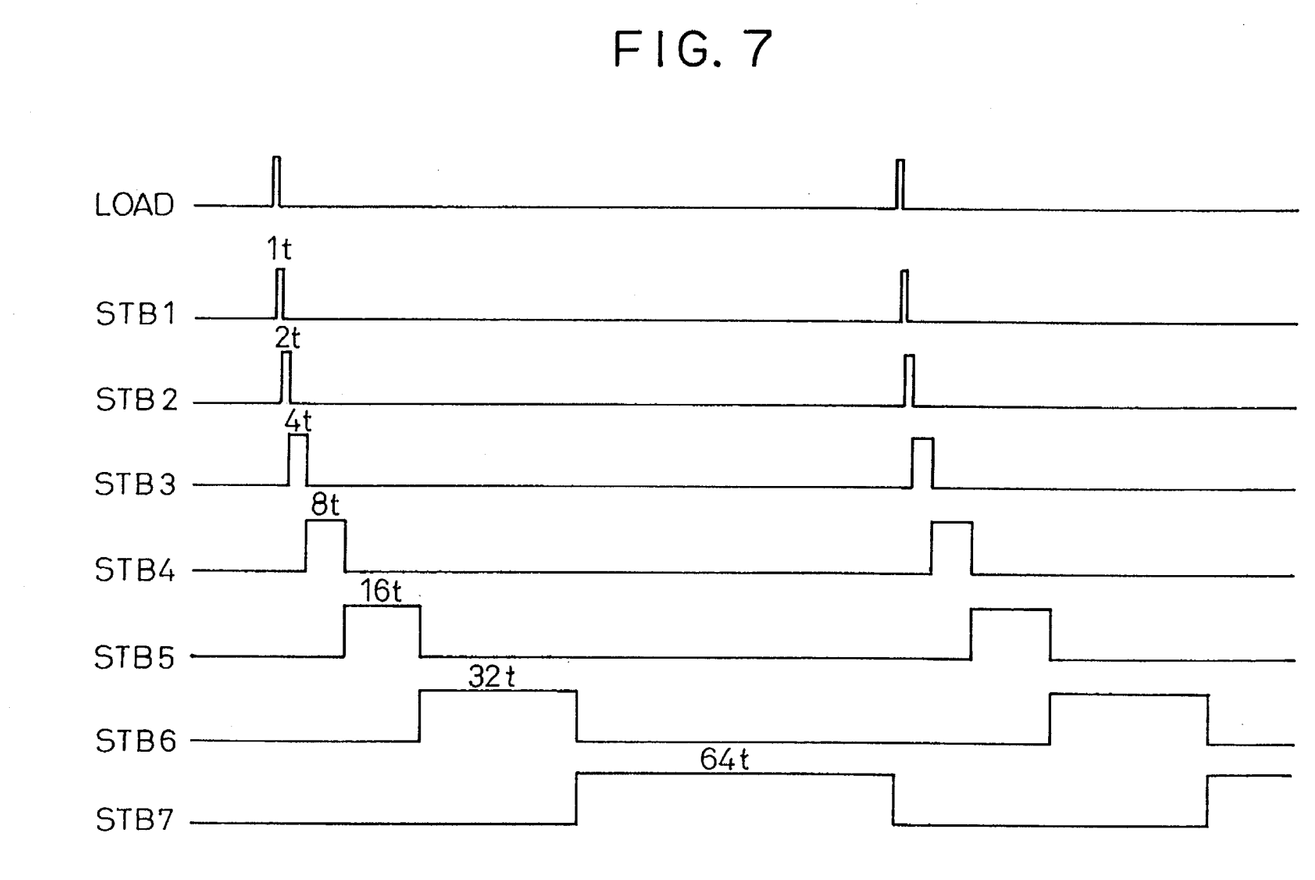
FIG. 7 is a timing diagram illustrating load and strobe signals in FIGS. 5 and 6.

Referring to FIG. 7, after the high load pulse, the controller 2 outputs seven non-overlapping high strobe pulses. Using the letter t to represent one suitable unit of time, first STB1 goes high for an interval of length 1t, then STB2 goes high for an interval of length 2t, then STB3 goes high for an interval of length 4t, and so on, each interval having double the length of the previous interval. All seven strobe pulses are completed before the next load pulse.

Figure 8:
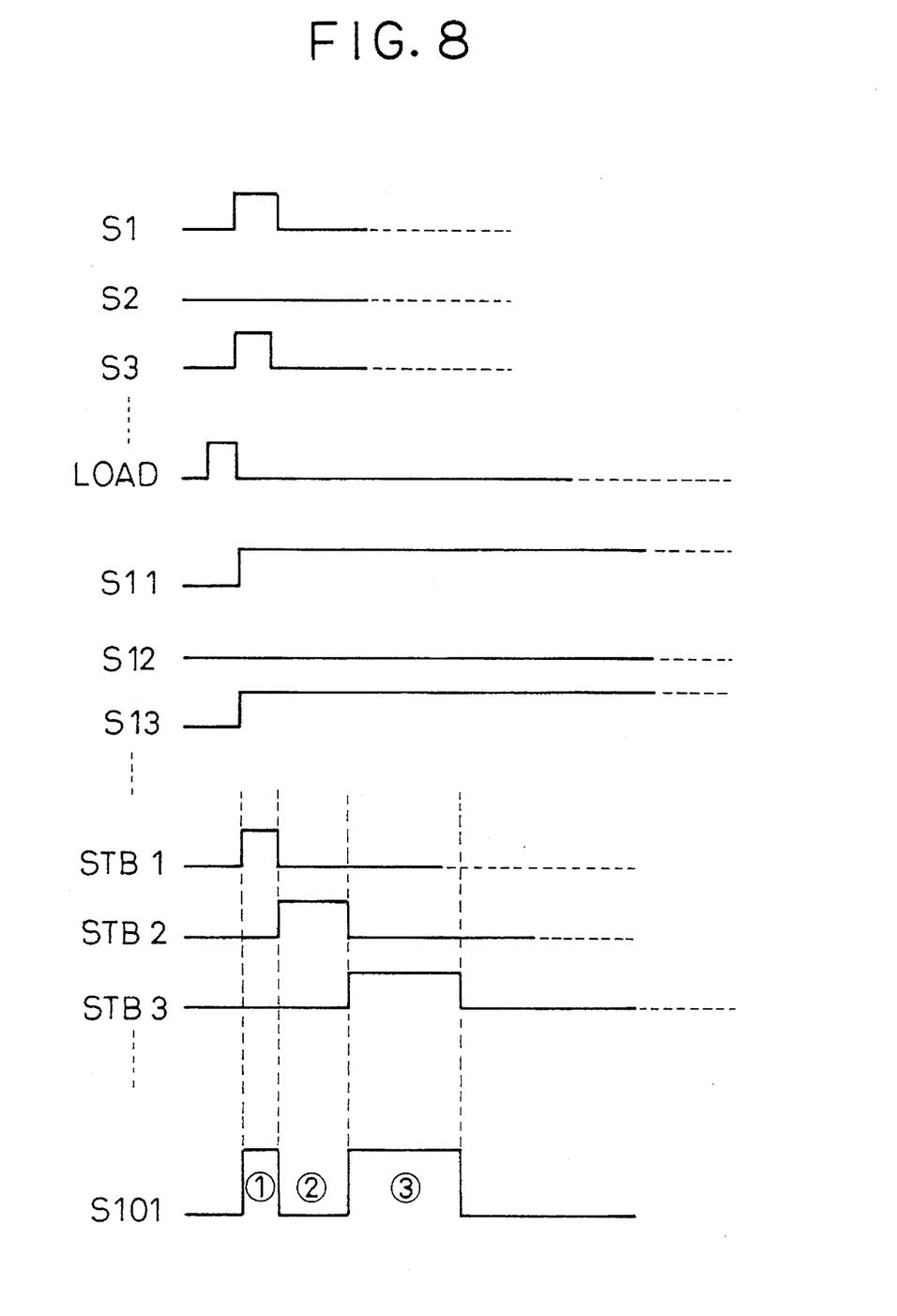
FIG. 8 is a timing diagram illustrating how a LED is switched on and off.

Referring to FIG. 8, suppose that the three least significant intensity-data bits S1, S2, and S3 of the first pixel are one, zero, and one, respectively. These bit values are illustrated by high signal levels for "one" data and low signal levels for "zero" data. When a load pulse is received, these data are transferred to and held in latches as latched data S11, S12, and S13. The selector for the first pixel ANDs latched data S11 with strobe pulse STB1, latched data S12 with strobe pulse STB2, and latched data S13 with strobe pulse STB3, then ORs the results of these AND operations to create the signal S101 output to the driver.

As a result, the driver for the first pixel is switched on during the intervals indicated by the circled digits one and three, and switched off during the interval indicated by the circled digit two. The total time during which the driver is switched on corresponds to the intensity value given by the M bits of intensity data for that pixel.

Instead of controlling image intensity by modulating the voltage supplied to the LEDs, the invented apparatus controls the time during which the LEDs are turned on and off. This is a purely digital operation; no digital-to-analog conversion is necessary. The entire integrated driver circuit 24 can have a simple, inexpensive configuration.

The progressive doubling of the lengths of the strobe signals in FIGS. 7 and 8 enables the total on-time of a LED driver to correspond exactly to the value conventionally represented by the M-bit intensity data. However, the invention is not limited to this scheme. Other schemes can be employed as necessary to accommodate driver and LED switching characteristics, perform gamma correction, or conform to other intensity data encoding rules.

Figure 9:
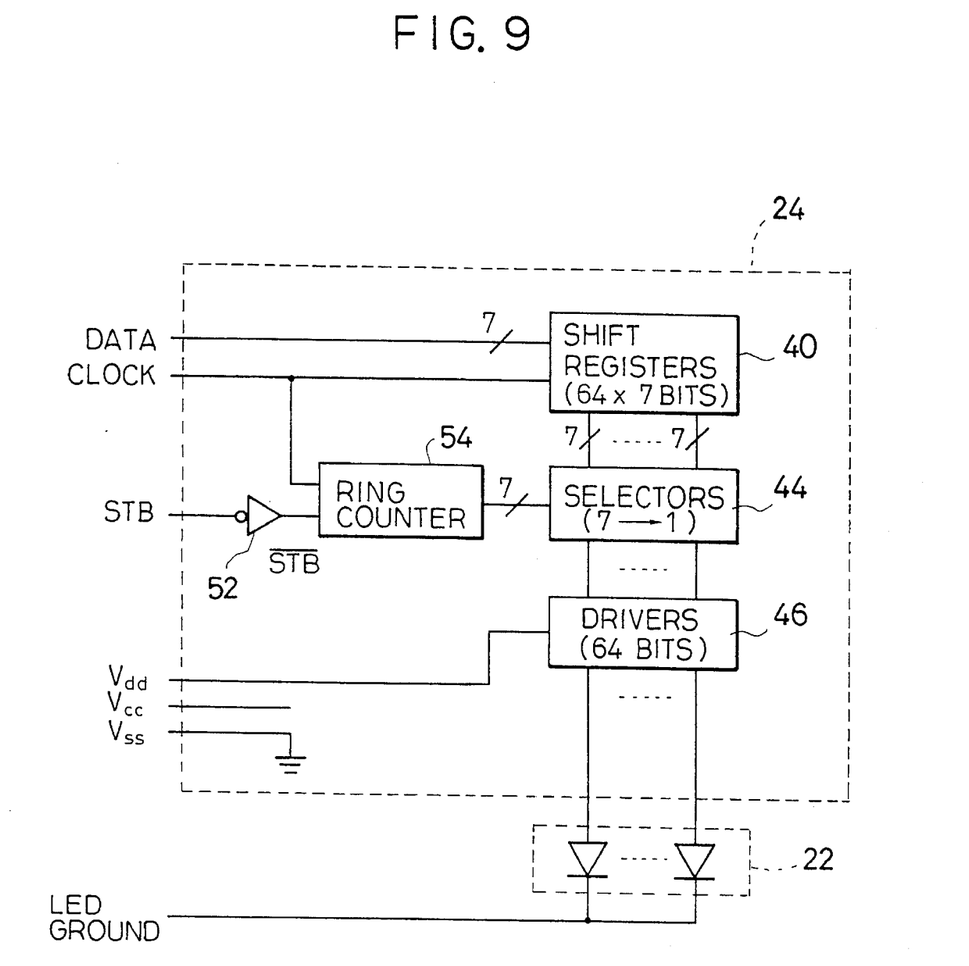
FIG. 9 is a block diagram of another configuration of the integrated circuit of FIG. 5.

FIG. 9 shows an alternative method of generating the strobe signals. Instead of supplying seven separate strobe signals, the controller 2 supplies a single strobe signal STB, which is inverted by a one-bit inverter 52. The inverted strobe signal $\overline{\text{STB}}$ is supplied to drive a ring counter 54, from which seven strobe signals are output to the selector section 44. The ring counter 54 is reset by the same clock signal from the controller 2 that clocks the shift-register section 40. Also, in FIG. 9 the data in the shift register section 40 are supplied directly to the selector section 44, with no intermediate latches.

Figure 10:
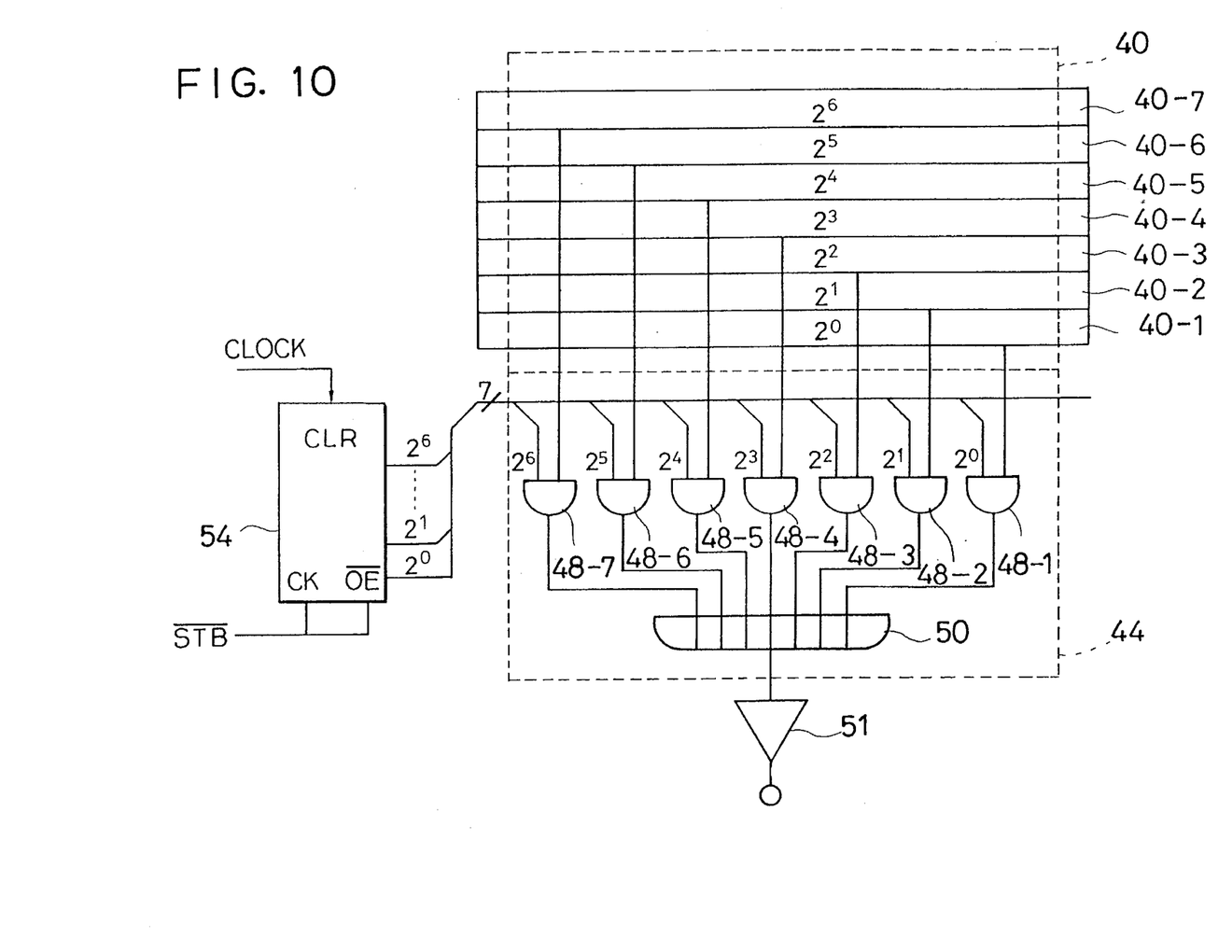
FIG. 10 is a circuit diagram of one selector in the integrated circuit of FIG. 9.

FIG. 10 shows the interconnections among the shift-register section 40, selector section 44, and ring counter 54 in FIG. 9. The two-input AND gates 48-1 to 48-7 are coupled to respective cells 40-1 to 40-7 in the seven shift registers in the shift-register section 40. (The drawing shows only one of the sixty-four cells in each shift register.) The ring counter 54 has at least seven output terminals, labeled in the drawing with powers of two from $2^0$ to $2^6$, which are connected to respective two-input AND gates 48-1 to 48-7. The clock signal from the controller 2 is coupled to a clear (CLR) input terminal of the ring counter 54. The inverted strobe signal $\overline{\text{STB}}$ from the inverter 52 is coupled to clock (CK) and output enable ($\overline{\text{OE}}$) terminals of the ring counter 54.

Next the operation of the ring counter 54 will be described.

The ring counter 54 internally holds seven bits of data which will be referred to by weight as bits $2^0, 2^1, \ldots, 2^6$. At each low-to-high transition at the CK input terminal, the contents of bit $2^0$ is shifted into bit $2^1$, the contents of bit $2^1$ is shifted into bit $2^2$, and so on the contents of the most significant bit $2^6$ being shifted into the least significant bit $2^0$.

When the signal level at the $\overline{\text{OE}}$ input terminal is low, the values of internal bits $2^0, 2^1, \ldots, 2^6$ are output on corresponding signal lines, labeled $2^0, 2^1, \ldots, 2^6$ in the drawing. An internal zero value is output as a low signal level; an internal one value is output as a high signal level. When the signal level at the $\overline{\text{OE}}$ input terminal is high, all these output signal lines $2^0, 2^1, \ldots, 2^6$ are held at the low (zero) level.

When the input at the CLR terminal is high, the ring counter 54 is reset to an initial state in which the least significant internal bit $2^0$ has the value one and the other internal bits $2^1$ to $2^6$ have the value zero.

Now the operation of the integrated driver circuit 24 in FIG. 9 will be described.

Figure 11:
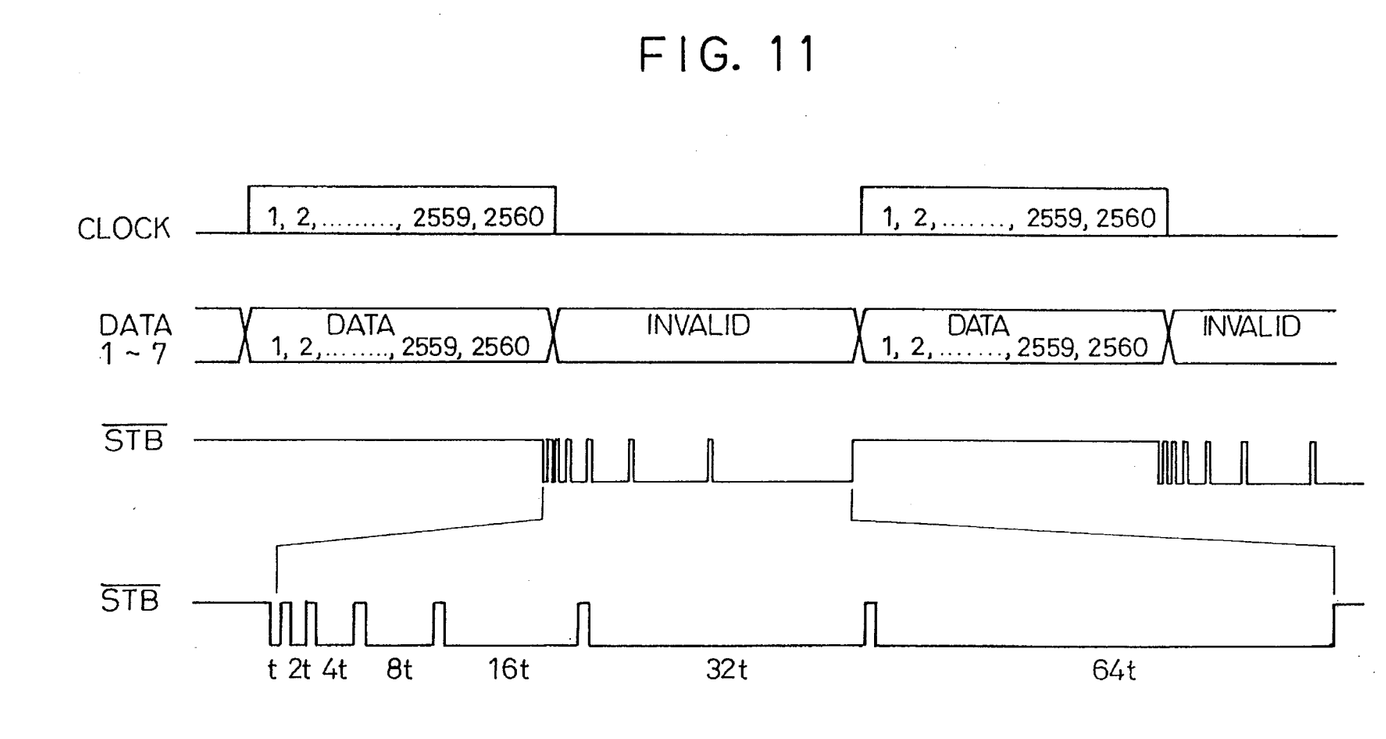
FIG. 11 is a timing diagram illustrating clock, data, and strobe signals in FIGS. 9 and 10.

Referring to FIG. 11, the controller 2 first outputs two thousand five hundred sixty clock pulses and transfers two thousand five hundred sixty units of seven-bit parallel data into the shift-register sections 40 of the driver circuits 24. Each of these two thousand five hundred sixty clock pulses also resets the ring counter 54 in each driver circuit 24 to the initial state described above. During this data transfer interval the strobe signal is inactive ($\overline{\text{STB}}$ is high), so all outputs of the ring counter 54 are low. All outputs of the AND gates in the selector section 44 are therefore low, so the outputs of the OR gates 50 are also low and the drivers and LEDs in the driver sections 46 and integrated LED arrays 22 are all switched off.

After transfer of the last data, the controller 2 holds the clock signal low and begins pulsing the strobe signal STB, driving it active (high) for progressively doubling intervals separated by short inactive (low) intervals. As a result the inverted strobe signal $\overline{\text{STB}}$ goes low for an interval of t, then high for an interval of (for example) t, then low for an interval of 2t, then high for an interval of t, then low for an interval off 4t, then high for an interval of t, and so on as illustrated at the bottom of FIG. 11. As before, t represents a suitable unit interval of time.

During the first interval of duration t while $\overline{\text{STB}}$ is low, since $\overline{\text{OE}}$ is also low, the ring counter 54 outputs the values of its internal bits. The ring counter 54 is still in the reset state, so it outputs a "one" (high) on the $2^0$ signal line and a "zero" (low) on the other signal lines. At the end of this interval, the low-to-high transition of $\overline{\text{STB}}$ shifts the "one" from the $2^0$ bit position to the $2^1$ bit position and simultaneously drops all outputs from the ring counter 54 to the low level. In the next interval (of duration 2t) in which $\overline{\text{STB}}$ and $\overline{\text{OE}}$ are low, the ring counter 54 outputs these new internal bit values, thus driving the $2^1$ signal line high and the other signal lines low. At the end of this 2t interval, the low-to-high transition of $\overline{\text{STB}}$ shifts the "one" from the $2^1$ bit position to the $2^2$ bit position in preparation for output on the $2^2$ signal line in the next (4t) low interval of $\overline{\text{STB}}$.

Continuing in this way, the ring counter 54 generates seven pulses on its seven output signal lines ($2^0, \ldots, 2^6$) that are identical to the STB1 to STB7 pulses in FIG. 7, except for being separated from one another by intervals of duration t. During the output of these seven strobe pulses, the controller 2 keeps the clock signal low and does not output any intensity data, as shown at the top of FIG. 11. At the end of these seven strobe pulses, when one line of pixels has been transferred to the photosensitive medium, $\overline{\text{STB}}$ sits high and output of clock pulses and intensity data begins again.

While the arrangement in FIGS. 9 to 11, has the advantage of requiring only one strobe signal line between the controller 2 and LED print head 6, it has the disadvantage that data transfer from the controller 2 to the LED print head 6 is interrupted while the LEDs are being driven. This disadvantage can easily be overcome, however, by adding a latch section 42, as in FIG. 5, to the circuit in FIG. 9, and providing other means For resetting the ring counter 54.

Alternatively, if it is desired to simplify the circuitry in FIG. 5 and speed of operation is not a problem, the latch section 42 can be removed from the apparatus in FIG. 5 and the selectors supplied with data directly from the shift registers, as in FIG. 9.

Next the structure and function of the wave-shaping circuits 4 and 26 in FIGS. 1 and 2 will be described.

Figure 12:
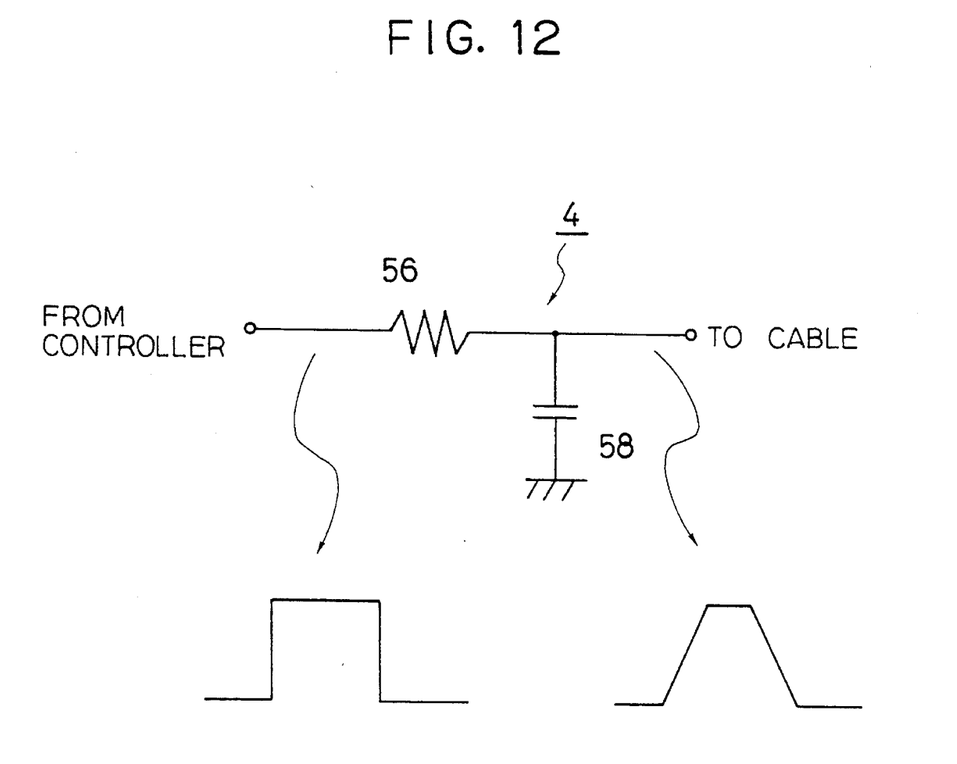
FIG. 12 illustrates a wave-shaping circuit.

Referring to FIG. 12, the wave-shaping circuit 4 comprises, for each signal Line in the cable 5, a resistor 56 inserted in series between the controller 2 and cable 5, and a capacitor 58 coupled between the signal line and ground. The time constant of resistor 56 and capacitor 58 converts sharp transitions in signals received from the controller 2 to more moderate transitions in the signals sent over the cable 5, as illustrated at bottom in FIG. 12. The purpose of this reshaping of the signal waveforms is to reduce the electromagnetic spike noise generated at signal transitions.

Figure 13:
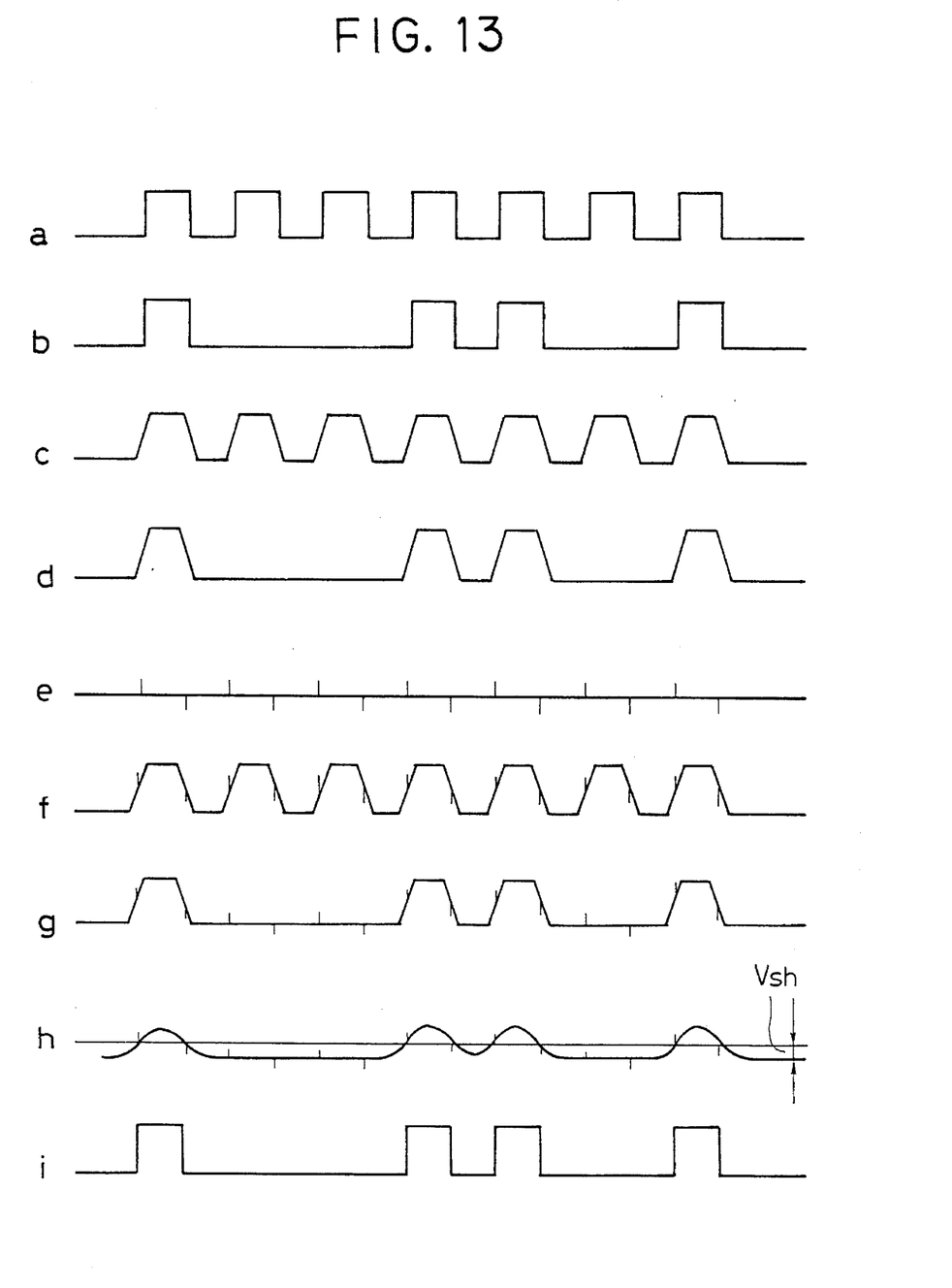
FIG. 13 is a timing diagram illustrating the wave-shaping of clock and data signals.

Referring to FIG. 13, the clock signal (a) and data signals (b) output by the controller 2 are digital signals with sharp rising and falling edges. The wave-shaping circuit 4 reshapes these signals as described above. Transmission of the reshaped clock pulses (c) and data signals (d) over the cable 5 results in only small amounts of spike noise (e).

The wave-shaping circuit 26 receives the clock signals (f) and data signals (g) with the spike noise superimposed, and compares them with a threshold voltage Vsh in order to restore sharp signal transitions. FIG. 13 illustrates the comparison of a received data signal with a threshold level (h), and shows the resulting data signal (i). The data signal (i) output by the wave-shaping circuit 26 is identical to the data signal (b) output by the controller 2. The spike noise is too small to have a disturbing effect.

Figure 14:
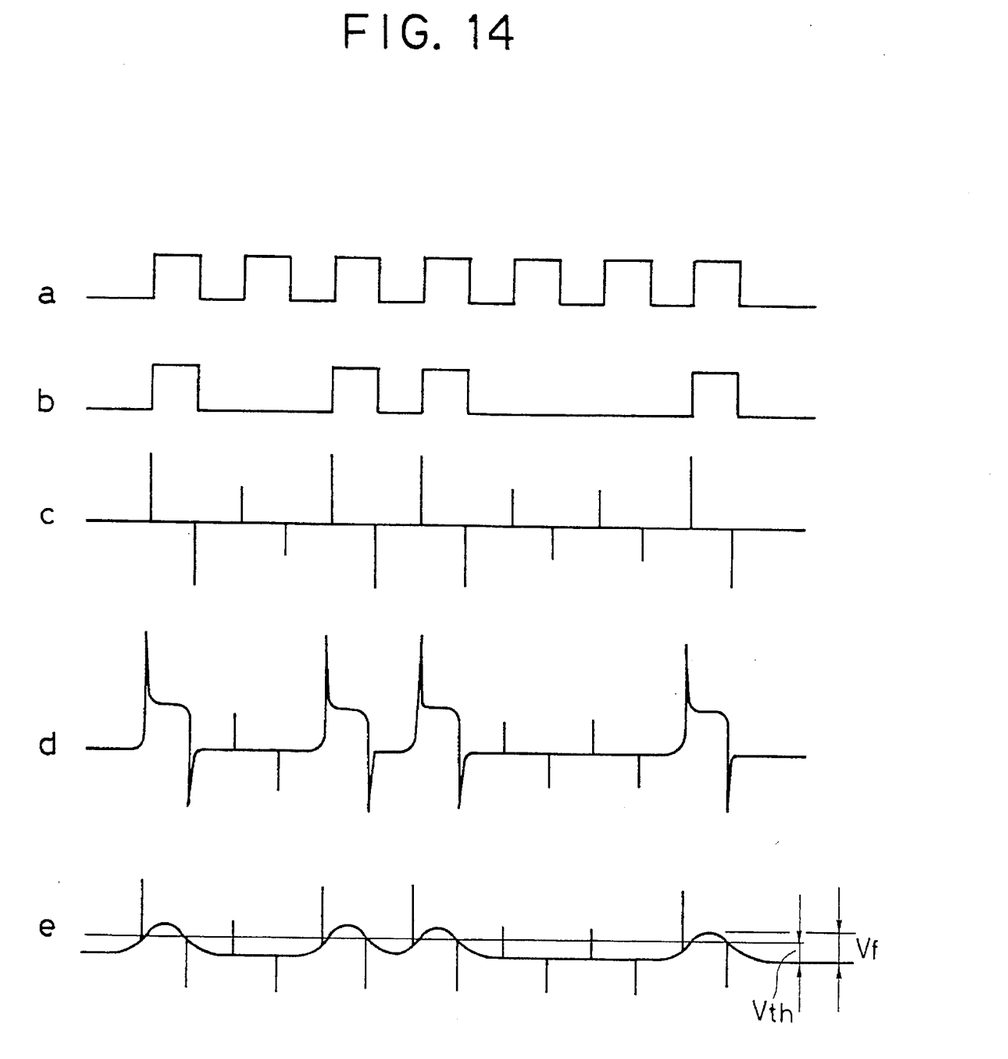
FIG. 14 is a timing diagram illustrating clock and data signals without wave-shaping.

By contrast, FIG. 14 shows the result of transmitting clock signals (a) and data signals (b) over the cable 5 without reshaping of their waveforms. The sharp signal transitions generate pronounced spike noise (c), which is superimposed by electromagnetic induction on the data signal (d). When received at the input terminal 28 of the LED print head 6, this data signal (e) has been further modified by travel through the cable 5, so that the data pulses are more rounded and their voltage swing Vf is reduced. Much of the spike noise exceeds the switching threshold Vth of logic circuits in the LED print head 6, which threshold Vth must be set within the voltage swing Vf of the received data. The result is a noisy image. A comparison of FIGS. 13 and 14 shows that the wave-shaping circuits 4 and 26 can be highly effective in removing image noise.

The wave-shaping circuit 26 in FIG. 2 comprises, for example, one hysteresis circuit of the well-known Schmitt-trigger type for each data signal transmitted over the cable 5. Integrated circuits containing multiple Schmitt triggers are commercially available, and can easily be added to the the LED print head 6 without changing the design of the integrated driver circuits 24.

Figure 15:
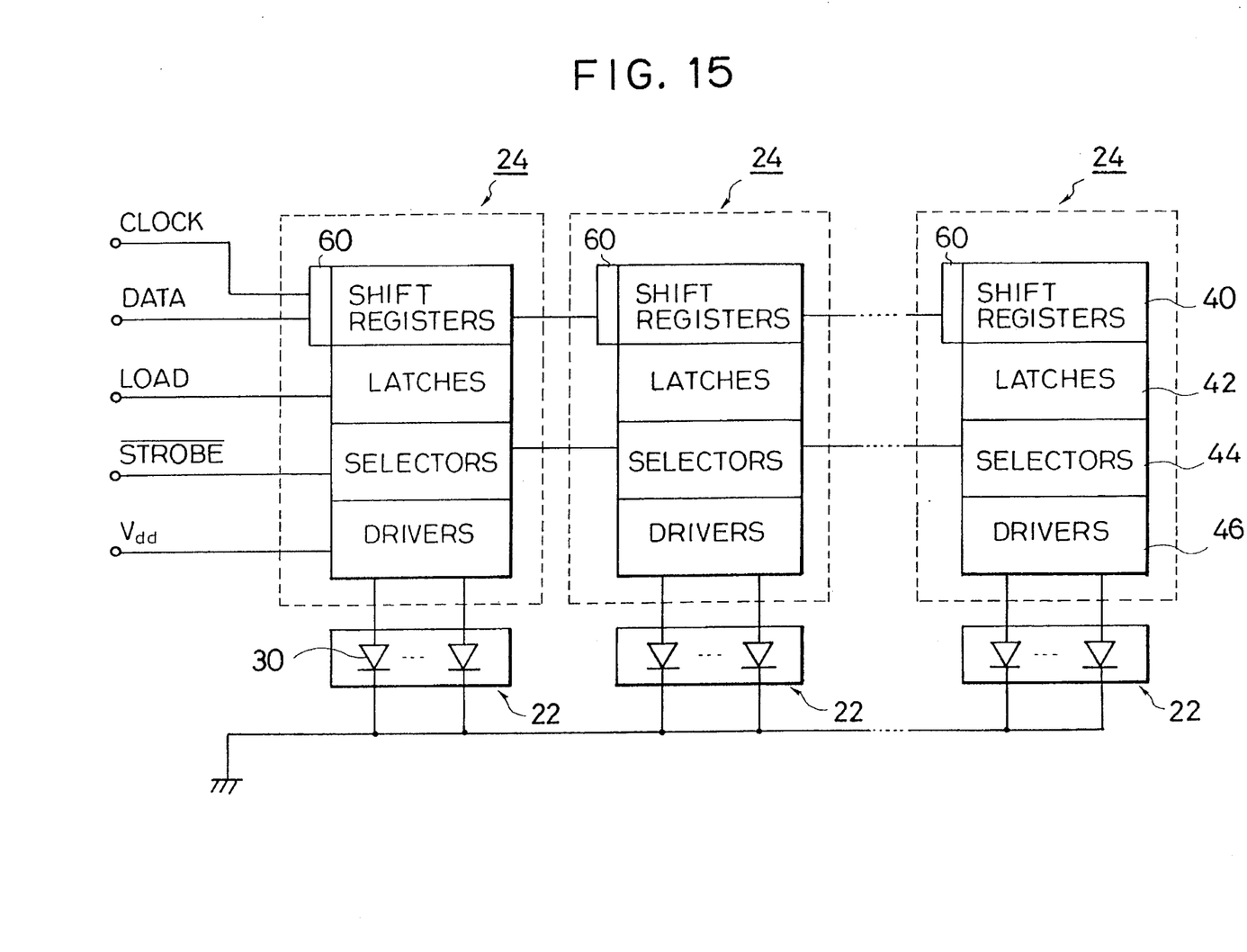
FIG. 15 is a modified block diagram of the LED print head.

Referring to FIG. 15, Schmitt triggers 60 or other suitable wave-shaping circuits can also be integrated directly into the shift-register sections 40 of the integrated driver circuits 24. Besides reducing the total chip count, this scheme eliminates noise occurring in transmission of signals over printed wiring traces on the printed circuit board 20, and eliminates the voltage drop due to the electrical impedance of these wiring traces.

Those skilled in the art will recognize that the embodiments described above can be modified in various ways, in addition to those already mentioned, without departing from the scope of the invention as claimed below.

What is claimed is:

1. A method of controlling an array of N light-emitting elements to create an intensity-graded image on a photosensitive medium, where N is an integer greater than one, comprising the steps of:

shifting M-bit parallel data by means of a clock signal into a set of M shift registers, where M is a fixed integer greater than one, until each of said shift registers contains N bits of data, corresponding to respective light-emitting elements;

generating M strobe signals which are active for non-overlapping intervals of time of different lengths, each of said M strobe signals corresponding to a different shift register in said set of M shift registers, and thus to the N bits stored therein;

performing a separate AND operation on each bit stored in said M shift registers and its corresponding strobe signal, thus performing M AND operations per light-emitting element;

performing, for each light-emitting element among said N light-emitting elements, an OR operation on results of said M AND operations; and switching each said light-emitting element on and off according to a result of said OR operation.

2. The method of claim 1, comprising a further step of latching the contents of said shift registers, said AND operations being performed on data thus latched while new data are shifted into said shift registers.

3. The method of claim 1, wherein the step of generating M strobe signals comprises driving a ring counter by means of pulses of different lengths.

4. The method of claim 3, wherein the step of generating M strobe signals further comprises resetting said ring counter by means of said clock signal.

5. The method of claim 1, wherein said clock signal and said M-bit parallel data are supplied to said shift registers through a cable, comprising the further steps of:

wave-shaping said clock signal and said M-bit parallel data before entry to said cable, to eliminate sharp transitions; and wave-shaping said M-bit parallel data after exit from said cable, to restore sharp transitions.

6. The method of claim 5, wherein said clock signal and said M-bit parallel data are wave-shaped before entry to said cable by respective resistor-capacitor circuits.

7. The method of claim 5, wherein said M-bit parallel data are wave-shaped after exit From said cable by respective Schmitt-trigger circuits.

8. An apparatus for controlling an array of N light-emitting elements to create an intensity-graded image on a photosensitive medium, where N is an integer greater than one, comprising:

a controller for providing for each of said light-emitting elements, respective M-bit intensity data, where M is an integer greater than one;

a set of M shift registers coupled to receive said intensity data in M-bit parallel form, each of said M shift registers receiving one bit at a time, and each of said M shift registers being capable of storing N bits;

a strobe signal generator for generating M strobe signals which are active for non-overlapping intervals of time of different lengths, each of said M strobe signals corresponding to a different shift register in said set of M shift registers;

a set of N selectors, each coupled to receive M bits including one bit from each of said M shift registers, for selecting one of said M bits; and a set of N drivers coupled to turn said light-emitting elements on and off responsive to outputs of respective selectors; wherein each selector in said set of N selectors separately comprises M two-input AND gates coupled to receive respective strobe signals, each two-input AND gate also receiving one of the M bits received by said selector; and an M-input OR gate coupled to receive outputs of said M two-input AND gates.

9. The apparatus of claim 8, Further comprising a set of latch circuits capable of storing M×N bits, coupled to receive said intensity data in parallel form from said shift registers and supply said intensity data to said selectors.

10. The apparatus of claim 8, wherein said active intervals have lengths proportional to consecutive integer powers of two.

11. The apparatus of claim 8, wherein said M non-overlapping strobe signals are output by said controller.

12. The apparatus of claim 8, further comprising a ring counter for producing said M non-overlapping strobe signals.

13. The apparatus of claim 12, where in said controller generates pulses of different lengths for driving said ring counter.

14. The apparatus of claim 8, wherein said controller generates a clock signal that clocks said shift registers.

15. The apparatus of claim 14, further comprising a ring counter for producing said M non-overlapping strobe signals, wherein said clock signal also resets said ring counter.

16. The apparatus of claim 14, comprising a cable for conveying said intensity data and said clock signal from said controller to said shift registers.

17. The apparatus of claim 16, comprising a first wave-shaping circuit for removing sharp transitions from said intensity data and said clock signal before entry to said cable.

18. The apparatus of claim 17, wherein said first wave-shaping circuit comprises resistors and capacitors.

19. The apparatus of claim 16, comprising a second wave-shaping circuit for comparing said intensity data with a threshold signal, thereby restoring sharp transitions, after exit from said cable.

20. The apparatus of claim 19, wherein said second wave-shaping circuit comprises Schmitt triggers.

21. The apparatus of claim 19, wherein said second wave-shaping circuit comprises at least one integrated circuit separate from said shift registers.

22. The apparatus of claim 19, wherein said second wave-shaping circuit is integrated with said shift registers.

* * * * *